(12) United States Patent
Slane et al.

(10) Patent No.: US 11,975,849 B2
(45) Date of Patent: May 7, 2024

(54) CARBON NANOTUBE YARN FOR PNEUMATIC DE-ICER STITCHING

(71) Applicant: Goodrich Corporation, Charlotte, NC (US)

(72) Inventors: Casey Slane, Tallmadge, OH (US); Daniel Waina, Uniontown, OH (US); Galdemir Cezar Botura, Copley, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 306 days.

(21) Appl. No.: 17/346,731

(22) Filed: Jun. 14, 2021

(65) Prior Publication Data

US 2022/0396360 A1 Dec. 15, 2022

(51) Int. Cl.
| | | |
|---|---|---|
| *B32B 9/00* | (2006.01) | |
| *B64D 15/16* | (2006.01) | |
| *C01B 32/158* | (2017.01) | |
| *D02G 3/02* | (2006.01) | |

(52) U.S. Cl.
CPC .......... *B64D 15/166* (2013.01); *C01B 32/158* (2017.08); *D02G 3/02* (2013.01); *C01B 2202/22* (2013.01); *D10B 2101/122* (2013.01)

(58) Field of Classification Search
CPC ..... Y10T 428/30; B82Y 30/00; B64D 15/166; C01B 32/156
USPC ......................................................... 428/408
See application file for complete search history.

(56) References Cited

U.S. PATENT DOCUMENTS

| | | |
|---|---|---|
| 5,337,978 A | 8/1994 | Fahrner et al. |
| 6,520,452 B1 | 2/2003 | Crist et al. |
| 9,994,326 B2 | 6/2018 | Hu |
| 10,780,984 B2 | 9/2020 | Fahrner et al. |
| 2018/0192476 A1 | 7/2018 | Chaudhry et al. |
| 2018/0215476 A1 | 8/2018 | Chee et al. |
| 2018/0305031 A1* | 10/2018 | Fahrner ................. D05B 93/00 |
| 2019/0292420 A1 | 9/2019 | Hu et al. |

FOREIGN PATENT DOCUMENTS

| | | |
|---|---|---|
| EP | 3098166 A1 | 11/2016 |
| EP | 3342711 A1 | 7/2018 |
| EP | 3498608 A1 | 6/2019 |
| EP | 3543138 A1 | 9/2019 |
| WO | 2008022129 A2 | 2/2008 |

OTHER PUBLICATIONS

European Search Report for Application No. 22178448.1, dated Oct. 12, 2022, 114 pages.

* cited by examiner

*Primary Examiner* — Daniel H Miller
(74) *Attorney, Agent, or Firm* — CANTOR COLBURN LLP

(57) ABSTRACT

A de-icing assembly for a surface of an aircraft includes: a carcass with a first layer, a second layer, and a carcass centerline and a plurality of seams sewn into the carcass, wherein the plurality of seams join the first and second layers of the carcass together. The assembly includes a plurality of inflation passages formed by the plurality of seams and disposed between the first and second layers of the carcass. The system also includes a manifold fluidly connected to and disposed beneath the carcass, the manifold comprising a width and a manifold centerline oriented approximately perpendicular or parallel to the carcass centerline. The seams are sown by a stitchline formed of carbon nanotube yarn.

20 Claims, 4 Drawing Sheets

CARBON NANOTUBE YARN FOR PNEUMATIC DE-ICER STITCHING

BACKGROUND

Exemplary embodiments of the present disclosure pertain to the art of ice protection systems, and more specifically to pneumatic de-icing systems for aircraft that includes stitches formed of carbon nanotube yarn.

During operation, aircraft face an undesirable risk of ice accretion on forward facing components such as the leading edge of wings, horizontal stabilizers, or other airfoils. Ice that forms on airfoil components can cause drag, loss of lift, and added weight. In order to avoid such problems, it is desired to provide an ice protection system that reduces ice formation on airfoil surfaces while also maintaining relatively low power expenditures by the ice protection system. One such ice protection system is a pneumatic de-icer.

Existing pneumatic de-icers (sometimes called de-icer boots) employ inflation tubes created between an inner layer and an outer layer of the de-icer. The inflation tubes inflate causing portions of the outer layers to move away from the aircraft structure. This movement deforms the outer layer so that ice that has accumulated on the outer layer cracks and is shed from the outer layer.

Pneumatic de-icers on airfoil leading edges horizontal stabilizers of some aircraft are subjected to a high utilization (e.g., inflation/deflation cycle) rate due to system operational designs of multiple inflations per de-icing cycle, as well as increased system utilization mandated for aircraft by aviation authorities due to severe icing events. This increased utilization of the pneumatic ice protection system results in increased fatigue of the de-icers. In some cases, for instance at the horizontal stabilizer location, the increased fatigue results in internal stitchline breakage followed by tearing of the surface plies of the material of the de-icer. In some cases, these tears become a scoop due to the flow of air over the horizontal stabilizer surface. This scoop affects flight quality on aircraft and, in some cases if not managed properly, can become a safety concern.

BRIEF DESCRIPTION

Disclosed is a de-icing assembly for a surface of an aircraft. The assembly includes a carcass with a first layer, a second layer, and a carcass centerline and a plurality of seams sewn into the carcass, wherein the plurality of seams joins the first and second layers of the carcass together. The assembly also includes a plurality of inflation passages formed by the plurality of seams and disposed between the first and second layers of the carcass and a manifold fluidly connected to and disposed beneath the carcass, the manifold comprising a width and a manifold centerline oriented approximately perpendicular or parallel to the carcass centerline. The seams are sown by a stitchline formed of carbon nanotube yarn.

In addition to one or more of the features described above, or as an alternative to any of the foregoing embodiments, each seam of the plurality of seams comprises can include a single stitchline.

In addition to one or more of the features described above, or as an alternative to any of the foregoing embodiments, the stitchlines of each seam can span the length of the carcass.

In addition to one or more of the features described above, or as an alternative to any of the foregoing embodiments, the assembly can further include a control unit that provides an electrical current to the single stitchline.

In addition to one or more of the features described above, or as an alternative to any of the foregoing embodiments, the control unit can be configured to determine a number of inflations of the assembly based on current passing through the single stitchline.

In addition to one or more of the features described above, or as an alternative to any of the foregoing embodiments, the control unit can be configured to determine that the single stitchline is broken based on current passing through the single stitchline.

In addition to one or more of the features described above, or as an alternative to any of the foregoing embodiments, a first reinforcement stitchline can be sewn into the carcass adjacent to one of the plurality of seams, wherein the first reinforcement stitchline is disposed at a location on the carcass overlapping with the manifold and wherein the first reinforcement stitchline is disposed approximately perpendicular to the manifold centerline and extends across the width of the manifold.

In addition to one or more of the features described above, or as an alternative to any of the foregoing embodiments, the assembly can comprise a first reinforcement stitchline sewn into the carcass adjacent to one of the plurality of seams, wherein the first reinforcement stitchline is disposed at a location on the carcass overlapping with the manifold and along an inflation passage fed by the manifold.

In addition to one or more of the features described above, or as an alternative to any of the foregoing embodiments, a length of the first reinforcement stitchline is greater than the width of the manifold.

In addition to one or more of the features described above, or as an alternative to any of the foregoing embodiments, the assembly can further comprise a second reinforcement stitchline sewn into the carcass adjacent to one of the plurality of seams, wherein the second reinforcement stitchline is disposed at a location on the carcass overlapping with the manifold and wherein the second reinforcement stitchline is disposed approximately perpendicular to the manifold centerline and extends across the width of the manifold.

Also disclosed is aircraft that includes an airfoil with a surface and a de-icing assembly of any prior embodiment.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
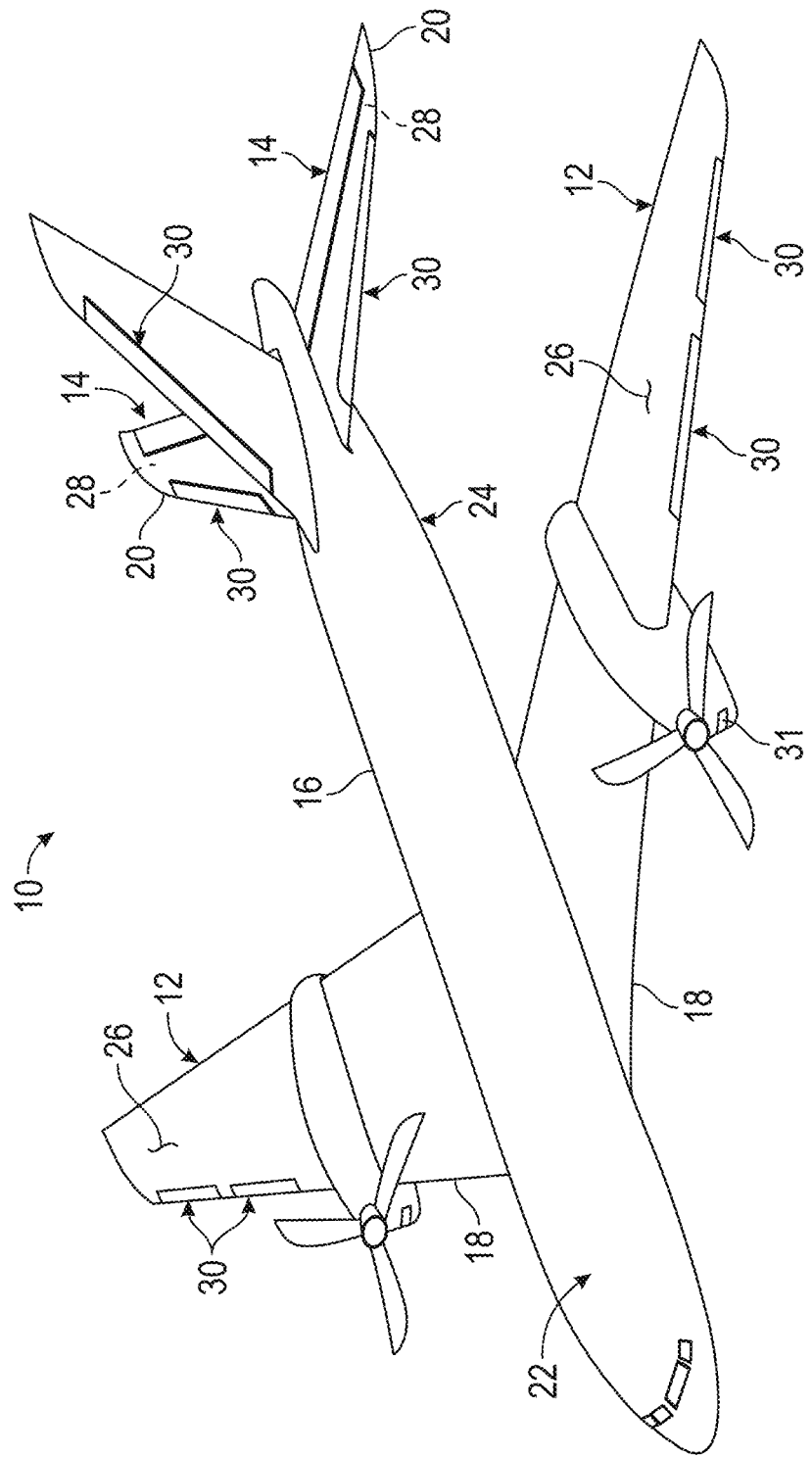
FIG. 1 is a perspective view of an aircraft with a pneumatic de-icing assembly.

FIG. 1 is a perspective view of aircraft 10 including wings 12, horizontal stabilizers 14, and fuselage 16. Wings 12 include leading edges 18 and horizontal stabilizers 14 include leading edges 20. In the illustrated configuration of FIG. 1, aircraft 10 is of a fixed-wing design. Fuselage 16 extends from nose section 22 to tail section 24, with wings 12 fixed to fuselage 16 between nose section 22 and tail section 24. Horizontal stabilizers 14 are attached to fuselage 16 on tail section 24. Wings 12 and horizontal stabilizers 14 function to create lift and to prevent pitching, respectively, for aircraft 10. Wings 12 and horizontal stabilizers 14 include critical suction surfaces, such as upper surfaces 26 of wings 12 and lower surfaces 28 of horizontal stabilizers 14, where flow separation and loss of lift can occur if icing conditions form on any of the surfaces of wings 12 and horizontal stabilizers 14. FIG. 1 also shows de-icing assemblies 30 mounted onto leading edges 18 of wings 12 and onto leading edges 20 of horizontal stabilizers 14. In other non-limiting embodiments, de-icing assemblies 30 can be mounted onto any leading edge or non-leading edge surface of aircraft 10. De-icing assemblies 30 function by filling with air to deform an outward surface of de-icing assemblies 30 so as to break apart ice formed on horizontal stabilizers. Further, it should be noted that the assemblies could be mounted to an engine lip and engine induction deicers generally shown by reference number 31.

Figure 2:
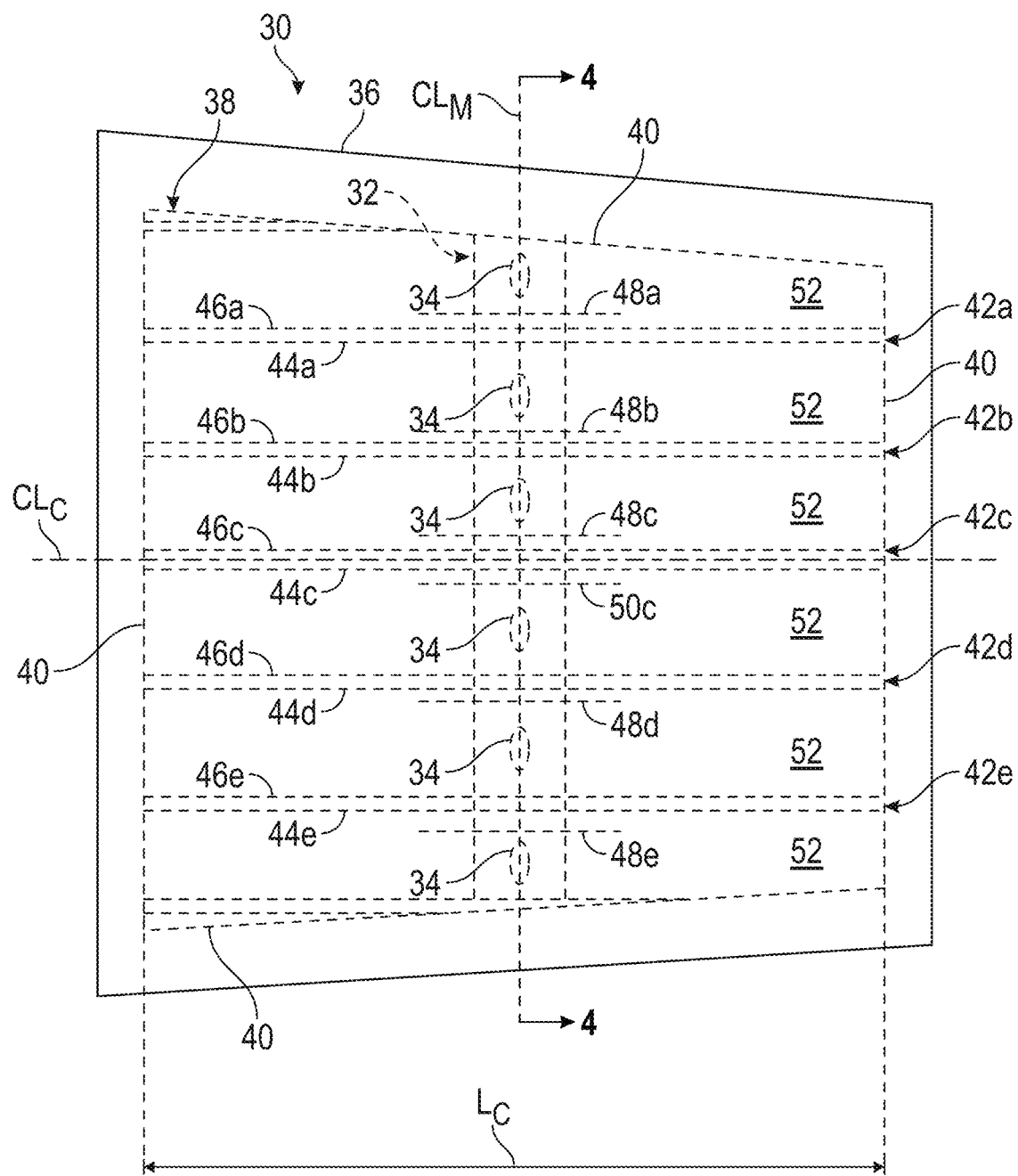
FIG. 2 is a top view of the pneumatic de-icing assembly with a pneumatic de-icer according to one embodiment.
Figure 3:
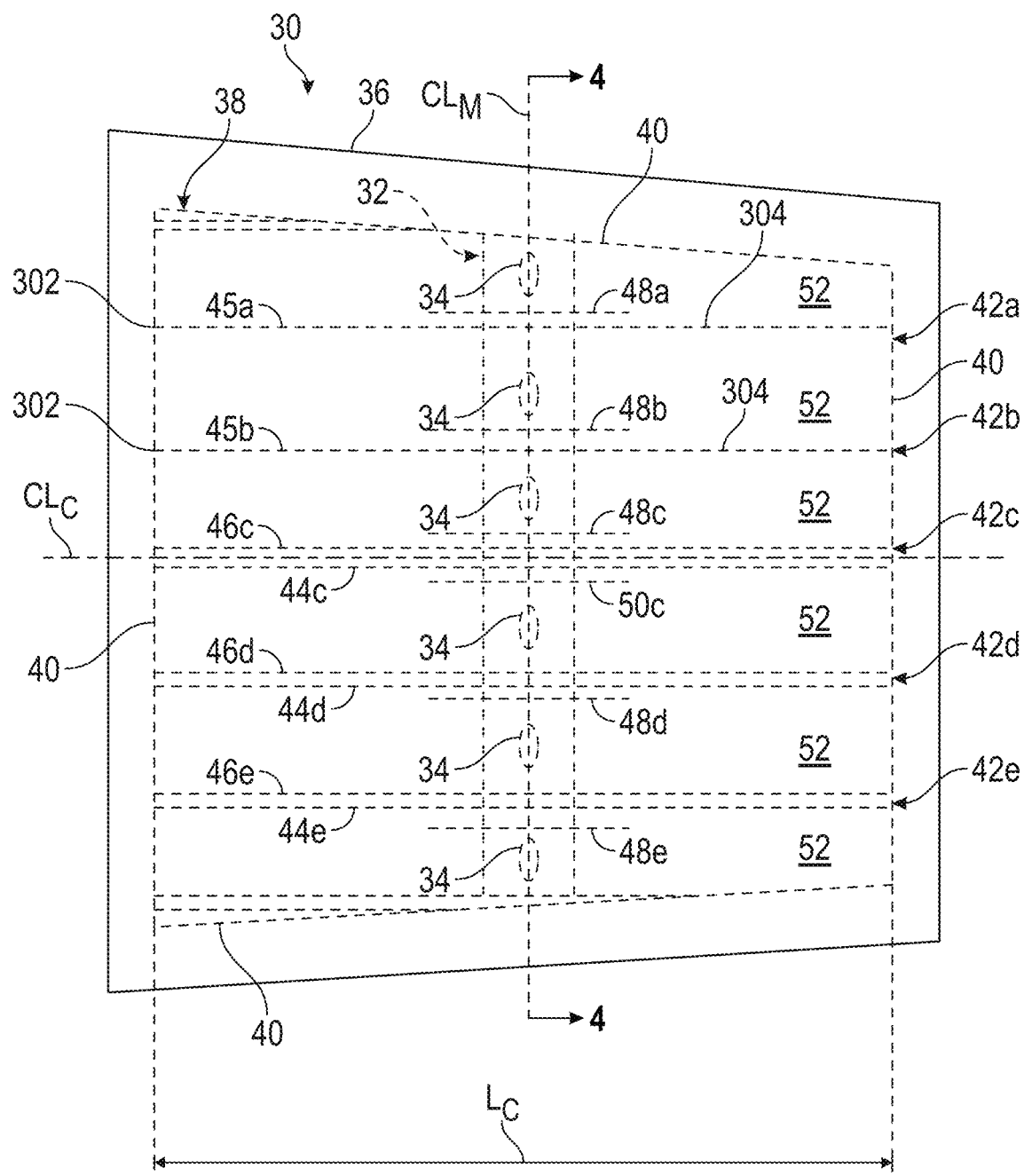
FIG. 3 is a top view of the pneumatic, de-icing assembly with a pneumatic de-icer according to one embodiment

FIG. 2 shows a top view of de-icing assembly 30 with manifold 32 (including air connection holes 34 and manifold centerline $CL_M$) and de-icer 36 (including carcass 38 with boundary 40, carcass centerline $CL_C$, seams 42 a-42 e, first stitchlines 44 a-44 e, second stitchlines 46 a-46 e, first reinforcement stitchlines 48 a-48 e, second reinforcement stitchline 50 c, and inflation passages 52). FIG. 2 also shows length $L_C$ of carcass 38. FIG. 3 is a cut-out detail view of de-icing assembly 30 and manifold 32. FIG. 3 also shows width $W_M$ of manifold 32 and length $L_{RS}$ of first reinforcement stitchlines 48 b-48 d and second reinforcement stitchline 50 c. FIGS. 2 and 3 show substantially similar views, and will be discussed in unison.

Herein, the stitches of any of first and second stitches 44, 46, can be formed of a carbon nanotube (CNT) yarn. The same CNT yarn can also be used in reinforcing stitch lines 48, 50. In prior systems, the first stitchlines 44 a-44 e, second stitchlines 46 a-46 e, first reinforcement stitchlines 48 a-48 e, and second reinforcement stitchline 50 c are loops of thread formed of para-aramid synthetic fiber, aramid polymer, aliphatic polyamide, semi-aromatic polyamide, or another type of synthetic polymer or polyamide. Inflation passages 52 are inflatable tubes or channels.

Further, as shown in FIG. 3, due to CNT yarn being stronger that prior art stitch materials, the need for two separate stich lines can be reduced and only a single stitch line 45 a-b may be needed. In FIG. 3, while the reinforcement stitchlines 48, 50 are shown, they can be optional and one or both can be omitted. Further, FIG. 3 that a combination of single stitch lines 45 can be included with double stichlines. Of course, only single stitchlines could be realized and FIG. 3 is not meant to require a combination.

In both FIGS. 2 and 3, the de-icing assembly 30 is an assembly of components configured to remove ice formed on de-icing assembly 30. Manifold 32 is a conduit for the transmission of a fluid such as a gas. Air connection holes 34 are orifices configured to allow passage of a fluid such as a gas. Width $W_M$ is a width of manifold 32 measured from left to right in FIGS. 2 and 3. In one non-limiting embodiment, width $W_M$ can be approximately 6 inches (15.24 centimeters). Manifold centerline $CL_M$ is an imaginary line passing through a center of manifold 32. De-icer 36 is an element configured to remove ice formed on de-icing assembly 30. In one non-limiting embodiment, de-icer 36 can include a pneumatic de-icer. Carcass 38 is a flexible, layered article configured to retain a volume of pressurized gas. Boundaries 40 are edges or borders of carcass 38. Carcass centerline $CL_C$ is an imaginary line passing through a center of carcass 38.

Seams 42 a-42 e are lines along which layers of carcass 38 are joined and/or attached together. In one non-limiting embodiment, any of seams 42 a-42 e can include one or more stitchlines such as described above. In one non-limiting embodiment, passages 52 can include a width (measured from top to bottom in FIGS. 2 and 3) of 1 inch (2.54 centimeters) between adjacent seams 42 a-42 e. In another non-limiting embodiment, passages 52 on either side of carcass centerline $CL_C$ can include a width of 1.25 inches (3.175 centimeters). Length $L_C$ is a length of carcass 38 (measured from left to right in FIGS. 2 and 3).

In operation, the de-icing assembly 30 is attached to or mounted to a surface of aircraft 10 such as one or both of horizontal stabilizers 14 (as shown in FIG. 1). Manifold 32 is fluidly connected to de-icer 36 and is disposed beneath carcass 38. Air connection holes 34 are fluidly connected to inflation passages 52 of carcass 38 and to an air supply (not shown) located on aircraft 10. Manifold centerline $CL_M$ extends longitudinally across manifold 32 and approximately bi-sects manifold 32 into halves approximately of equal size. Manifold centerline $CL_M$ is oriented approximately perpendicular to carcass centerline $CL_C$. De-icer 36 is fluidly connected to manifold 32. Carcass 38 is disposed above and fluidly connected to manifold 32. Boundaries 40 extend around a perimeter of carcass 38. Carcass centerline $CL_C$ extends longitudinally across (from left to right in FIGS. 2 and 3) carcass 38 and approximately bi-sects carcass 38 into two sections sized as necessary for the particular airfoil.

Seams 42 a-42 e extend longitudinally across carcass 38. Seams 42 a-42 e form channels 52 between consecutive seams 42 a-42 e. First stitchlines 44 a-44 e, second stitchlines 46 a-46 e (FIG. 2) or single stitchlines are sewn (e.g., stitched) into and through the layers of carcass 38 to attach the layers of carcass 38 together. If present, first reinforcement stitchlines 48 a-48 e, and second reinforcement stitchline 50 c are also so sewn.

In some non-limiting embodiments, first reinforcement stitchlines 44 a-44 e can be disposed on an opposite side of respective seams 42 a-42 e from carcass centerline $CL_C$. In other non-limiting embodiments, first reinforcement stitchlines 44 a-44 e can be disposed on a same side of respective seams 42 a-42 e as carcass centerline $CL_C$. In some non-limiting embodiments, second stitchlines 46 a-46 e can be disposed on an opposite side of respective seams 42 a-42 e from carcass centerline $CL_C$. In other non-limiting embodiments, second stitchlines 46 a-46 e can be disposed on a same side of respective seams 42 a-42 e as carcass centerline $CL_C$. Inflation passages 52 are formed by and extend between seams 42 a-42 e. Inflation passages 52 are disposed between the layers of carcass 38. Length $L_C$ extends across (from left to right in FIGS. 2 and 3) a length of carcass 38 in a direction approximately perpendicular to manifold centerline $CL_M$.

Pneumatic de-icing systems and functioning thereof are described in U.S. Pat. No. 6,520,452 to Crist et al. entitled "Deicer for Aircraft" issued Feb. 18, 2003 and in U.S. Pat. No. 5,337,978 to Fahrner et al. entitled "Leading Edge Pneumatic De-icer Assembly" issued Aug. 16, 1994, both of which are incorporated herein by reference in their entireties.

During operation of aircraft 10 in icing conditions, passages 52 of de-icer 36 are subjected to inflation and deflation during de-icing cycles of de-icer 36. As de-icer 36 performs de-icing cycles, the inflation and deflation of passages 52 causes fatigue in the layers of carcass 38. During normal operation of de-icer 36, second stitchlines 44 a-44 f distribute the stress along seams 42 a-42 e, respectively across two stitchline lines instead of just one. This effectively reduces the amount of stress experienced per stitch by 50% as compared to a configuration with only a single stitchline.

Figure 4:
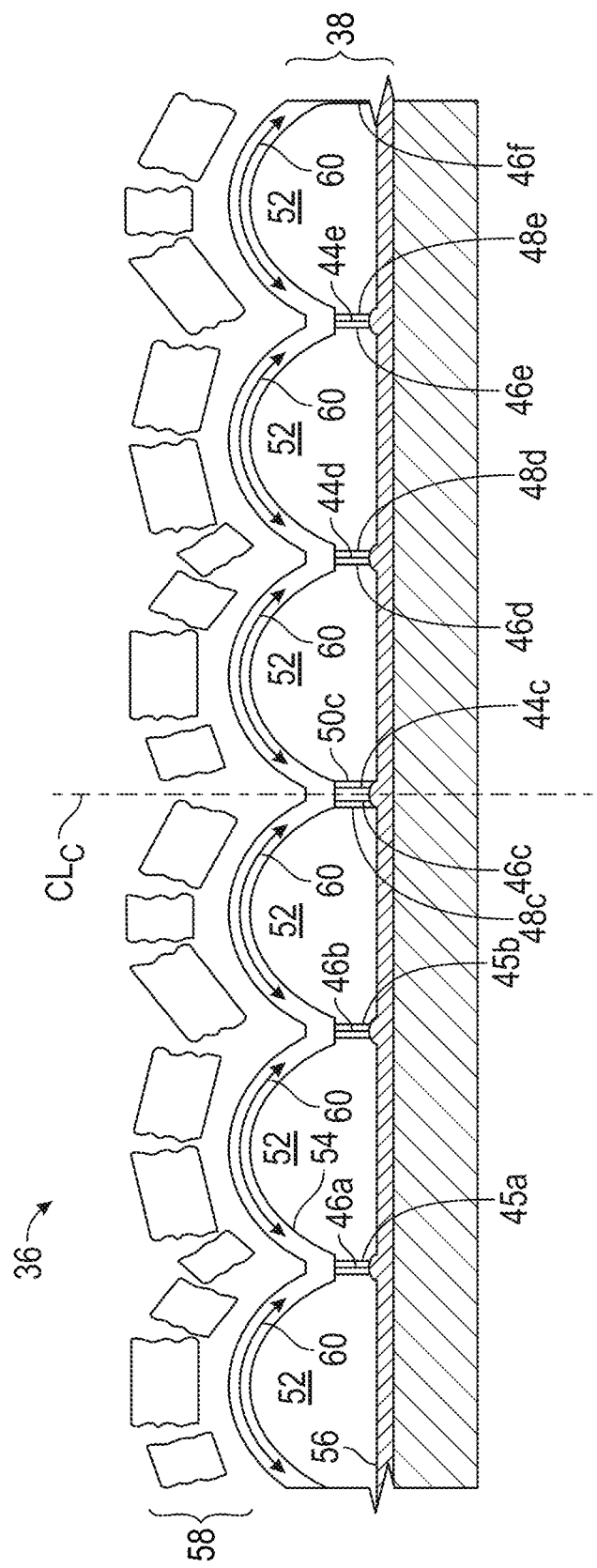
FIG. 4 is a cross-section view taken along 4-4 in FIG. 2 of the pneumatic de-icer in a distended (inflated) condition.

FIG. 4 shows a perspective view of de-icer 36 in a distended (e.g., inflated) condition and includes horizontal stabilizer 14, carcass 38, carcass centerline $CL_C$, seams 42 a-42 e, first stitchlines 44 a-44 e, second stitchlines 46 a-46 e, first reinforcement stitchlines 48 a-48 e, second reinforcement stitchline 50 c, inflation passages 52, first layer 54 of carcass 38, second layer 56 of carcass 38, ice 58, and tensile stresses 60. Manifold 32 is omitted from FIG. 4 for clarity.

The view of FIG. 4 shows carcass 38 in a distended, or inflated, state illustrating breakage of ice as well as the stress experienced by first and second layers 54 and 56 of carcass 38. As carcass 38 is inflated, first layer 54 pulls away from second layer 56 forming a curved shape. As first layer 54 pulls away from second layer 56, stress is placed on both first layer 54 and on second layer 56 in the form of tensile stress 60 and other forms of stress such as hoop stress. Tensile stress 60 and other forms of stress experienced by both first and second layers 54 and 56 of carcass 38 can lead to failure events related to the stichlines.

FIG. 4 further shows how single stitchline 45 in combination without or without first reinforcement stitchlines 48 a-48 c (e.g., stitchlines 48 and 50 are optional) help to distribute the stresses experience by de-icer 36 (such as tensile stresses 60) across multiple stitchlines helping to minimize the initiation of stitchline breakage, minimize the propagation rate of a stitchline break, stop the propagation of a stitchline break, and stop the propagation of a rupture of either first layer 54 or second layer 56 of carcass 38.

With reference to FIG. 3 and, it is noted, however, that the CNT fibers of the single stitch lines 45 can have the same effect at the first and second stitchlines in combination and, thus, reduce the amount of stitching needed. Further, due to the smaller sized of CNT yarn as compared to he prior art it can bonds to other layers in the system. Further, overtime the CNT yarn does not retain water and may last longer.

For the sake of completeness, it is noted that a CNT yarn is a fiber formed of carbon nanotubes wound together. The CNT's can be cylinders of one or more layers of graphene (lattice). Such a yarn can be formed such that is electrically conductive in one embodiment and as more fully described below.

This electrically conductive nature of the the CNT yarn can allow for the yarns to be used for other purposes as well. Firstly, and with reference to FIG. 3, a control element 302 can be provided that is electrically connected to the single stitchlines 45a, 45b. The control element 302 can provide a current to the single stitchlines 45a, 45b in one embodiment. When provided, if the current is not as expected, that can indicate that the single stitchlines 45a, 45b has broken. Further, the To that end, as part of the controller 302 as a separate element 304 as illustrated, the current can be sensed by a sensor 304. The sensor 304 could, for example, determine variations in current received that could indicate a change in resistance in the stitchlines 45a, 45b. This indication could be used by the control unit 302 to count how often the deicer has be cycled and could be used to plan inspection or servicing of the deicer.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A de-icing assembly for a surface of an aircraft, the de-icing assembly comprising:
   a carcass with a first layer, a second layer, and a carcass centerline;
   a plurality of seams sewn into the carcass, wherein the plurality of seams join the first and second layers of the carcass together;
   a plurality of inflation passages formed by the plurality of seams and disposed between the first and second layers of the carcass;
   a manifold fluidly connected to and disposed beneath the carcass, the manifold comprising a width and a manifold centerline oriented approximately perpendicular or parallel to the carcass centerline; and
   wherein the seams are sown by a stitchline formed of carbon nanotube yarn.

2. The de-icing assembly of claim 1, wherein each seam of the plurality of seams comprises includes a single stitchline.

3. The de-icing assembly of claim 2, wherein the stitchlines of each seam spans the length of the carcass.

4. The de-icing assembly of claim 2, further comprising a control unit that provides an electrical current to the single stitchline.

5. The de-icing assembly of claim 4 wherein the control unit is configured to determine a number of inflations of the assembly based on current passing through the single stitchline.

6. The de-icing assembly of claim 4 wherein the control unit is configured to determine that the single stitchline is broken based on current passing through the single stitchline.

7. The de-icing assembly of claim 6, further comprising a first reinforcement stitchline sewn into the carcass adjacent to one of the plurality of seams, wherein the first reinforcement stitchline is disposed at a location on the carcass overlapping with the manifold and wherein the first reinforcement stitchline is disposed approximately perpendicular to the manifold centerline and extends across the width of the manifold.

8. The de-icing assembly of claim 6, further comprising a first reinforcement stitchline sewn into the carcass adjacent to one of the plurality of seams, wherein the first reinforcement stitchline is disposed at a location on the carcass overlapping with the manifold and along an inflation passage fed by the manifold.

9. The de-icing assembly of claim 1, wherein a length of the first reinforcement stitchline is greater than the width of the manifold.

10. The de-icing assembly of claim 7, further comprising a second reinforcement stitchline sewn into the carcass adjacent to one of the plurality of seams, wherein the second reinforcement stitchline is disposed at a location on the carcass overlapping with the manifold and wherein the second reinforcement stitchline is disposed approximately perpendicular to the manifold centerline and extends across the width of the manifold.

11. An aircraft comprising:
an airfoil with a surface; and
a de-icing assembly as recited in claim 1 mounted to the surface of the airfoil.

12. The aircraft of claim 11, wherein each seam of the plurality of seams comprises includes a single stitchline.

13. The aircraft of claim 11, wherein the stitchlines of each seam spans the length of the carcass.

14. The aircraft of claim 11, wherein the stitchlines of each seam extend in the chordwise direction.

15. The aircraft of claim 12, further comprising a control unit that provides an electrical current to the single stitchline.

16. The aircraft of claim 15, wherein the control unit is configured to determine a number of inflations of the assembly based on current passing through the single stitchline.

17. The aircraft of claim 15, wherein the control unit is configured to determine that the single stitchline is broken based on current passing through the single stitchline.

18. The aircraft of claim 11, further comprising a first reinforcement stitchline sewn into the carcass adjacent to one of the plurality of seams, wherein the first reinforcement stitchline is disposed at a location on the carcass overlapping with the manifold and wherein the first reinforcement stitchline is disposed approximately perpendicular to the manifold centerline and extends across the width of the manifold.

19. The aircraft of claim 18, wherein a length of the first reinforcement stitchline is greater than the width of the manifold.

20. The aircraft of claim 18, further comprising a second reinforcement stitchline sewn into the carcass adjacent to one of the plurality of seams, wherein the second reinforcement stitchline is disposed at a location on the carcass overlapping with the manifold and wherein the second reinforcement stitchline is disposed approximately perpendicular to the manifold centerline and extends across the width of the manifold.

* * * * *